United States Patent Office 3,331,551
Patented July 18, 1967

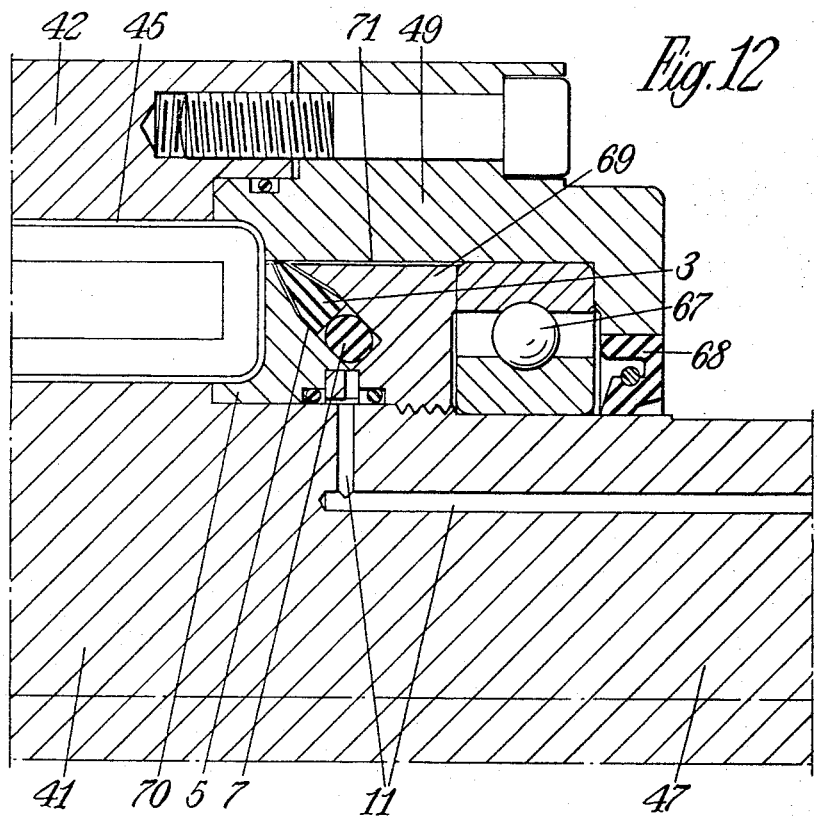

3,331,551
ARRANGEMENT FOR SEALING A PRESSURE-LOADED GAP BETWEEN TWO SURFACES FACING EACH OTHER ON TWO MACHINE ELEMENTS ROTATABLE RELATIVELY TO EACH OTHER IN HYDRAULIC MACHINES
Franz Sneen, Topasgatan 40, V. Frolunda,
Goteborg, Sweden
Filed Sept. 30, 1966, Ser. No. 583,247
Claims priority, application Sweden, May 27, 1966,
7,266/66
11 Claims. (Cl. 230—145)

The present invention concerns an arrangement for sealing a pressure-loaded gap between two surfaces facing each other on two machine elements rotatable relatively to each other in hydraulic machines.

In hydraulic rotary motors comprising a casing and an inner part limitedly or un-limitedly rotatable relatively to the casing a necessity often arises of providing an annular seal between two surfaces facing each other on the casing and the inner part respectively, for instance, for the gap, unavoidable for technical production reasons, between their flanged ends.

In order not to expose these seals to unnecessary wear, with the necessity entailed thereby of expensive dismantling for exchanging the worn-out seals, it is desirable to make the surfaces contacting each other with sliding friction in these seals as small as possible.

The present invention relates to such an arrangement which has proved to afford a sealing not hitherto achieved and which is to a large extent self-correcting with wear, as well as involving, in addition, extremely little wear, so that it is exceptionally reliable in operation.

The arrangement according to the invention has the feature that it comprises an annular recess whose two sides in the inner part of the recess are equidistant, but towards the mouth of the recess pass over into parts converging towards the mouth, so that these convergent parts form in cross section a V-shaped groove which opens out into the gap that is to be sealed, and a sealing ring which is located in this recess and provided with a lip fitting the V-shaped groove and adapted to be applied by an hydraulic pressure acting upon the wider side (back side) of the ring opposite the lip with a blade-like edge against the pressure-loaded gap located at the bottom of the V-shaped groove, the pressure acting upon the rear of the ring being per unit area at least equally great as the pressure per unit area acting upon the edge of its lip.

The invention will now be described with reference to the accompanying drawings, which show embodiments of the invention but in no restrictive sense.

Figure 1:
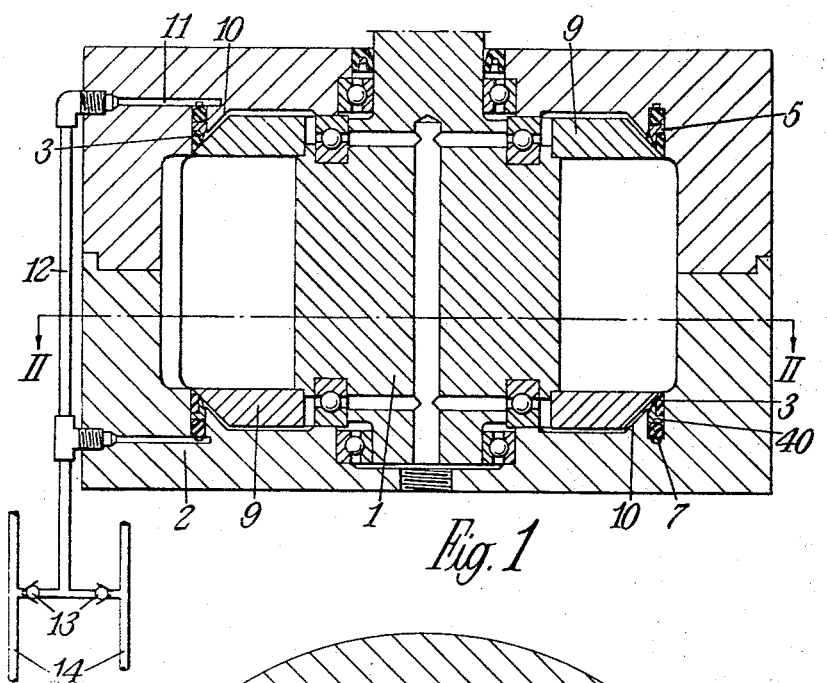
Figure 2:
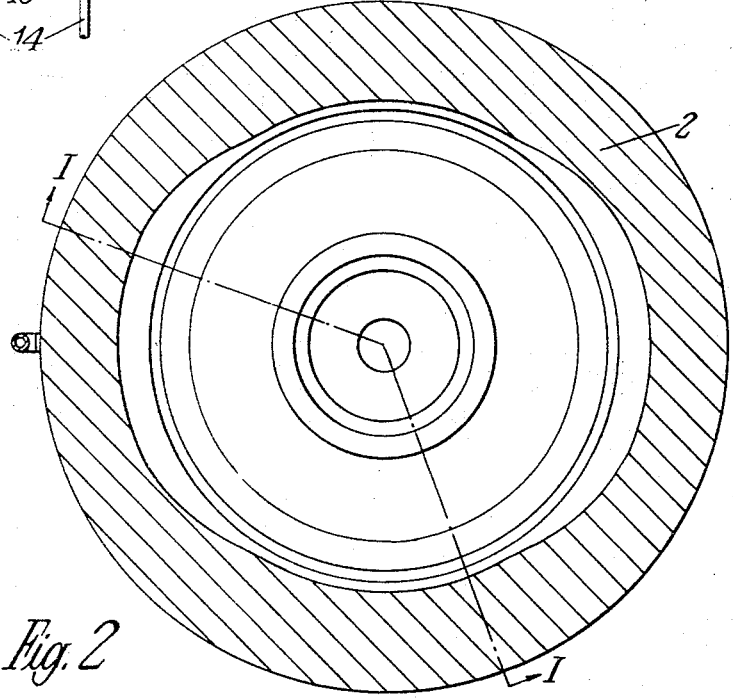
Figure 3:
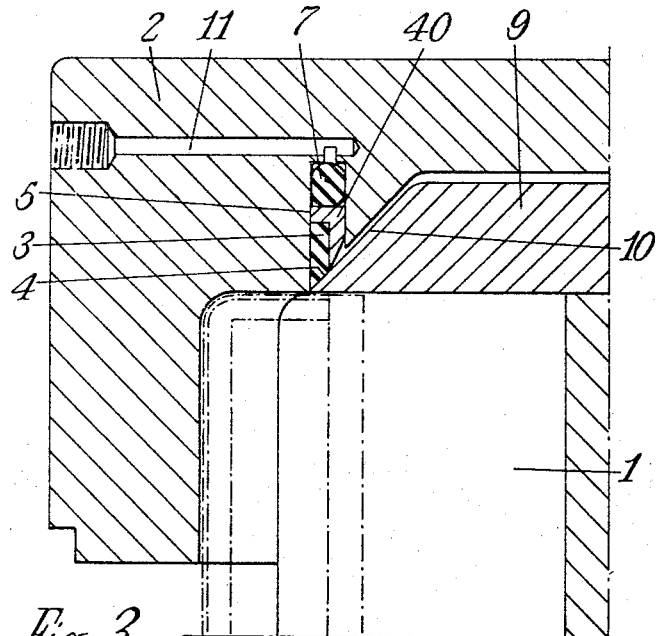
Figure 4:
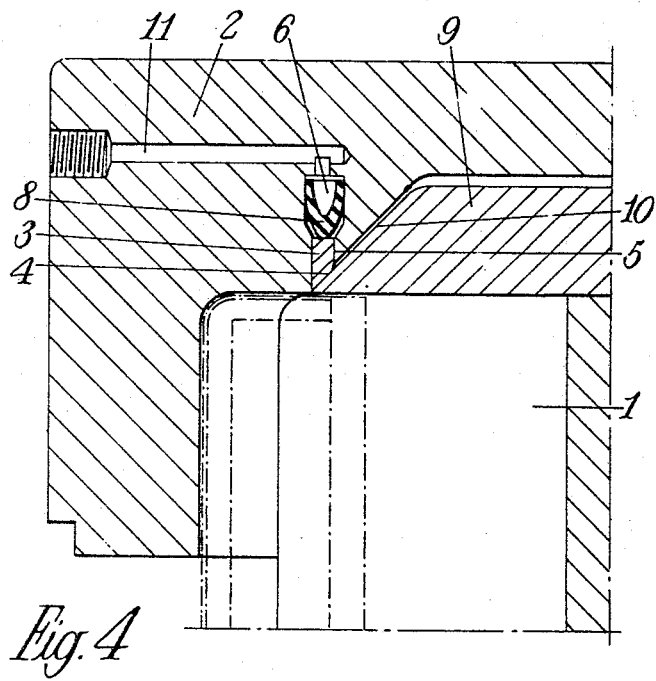
Figure 5:
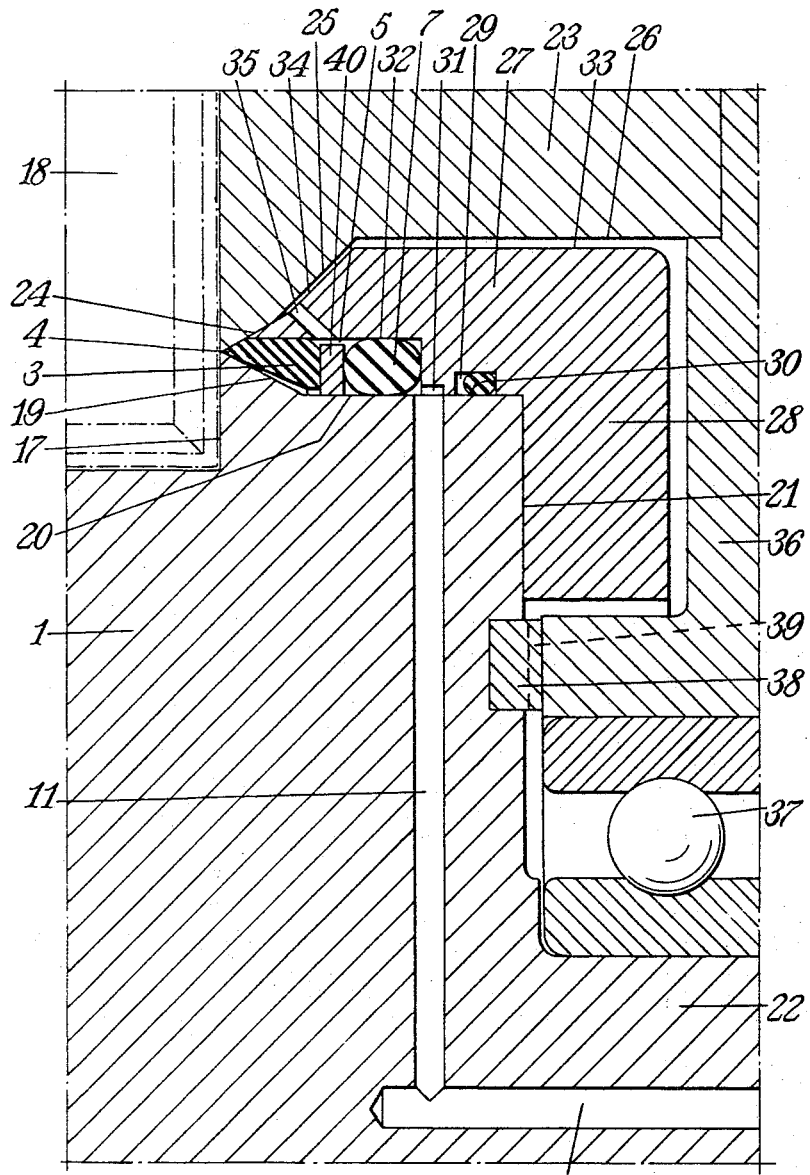
Figure 6:
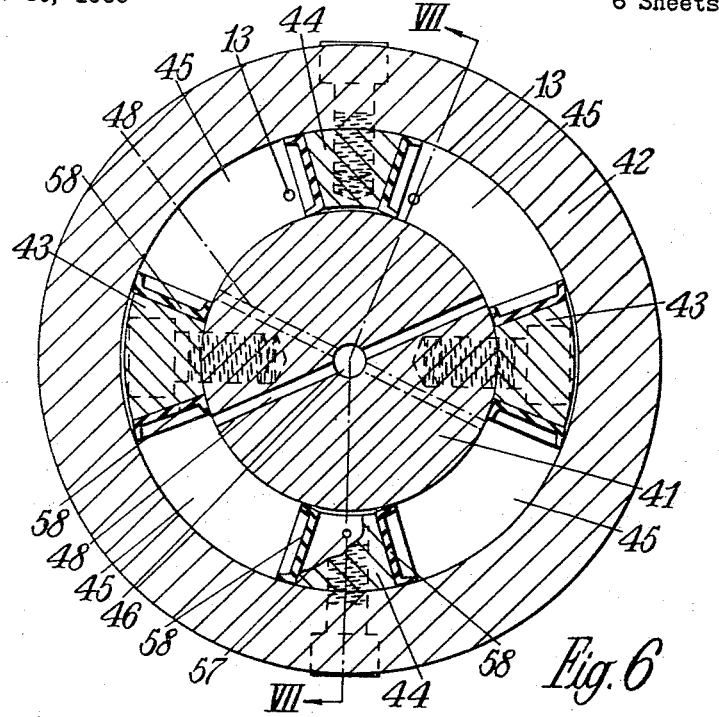
Figure 7:
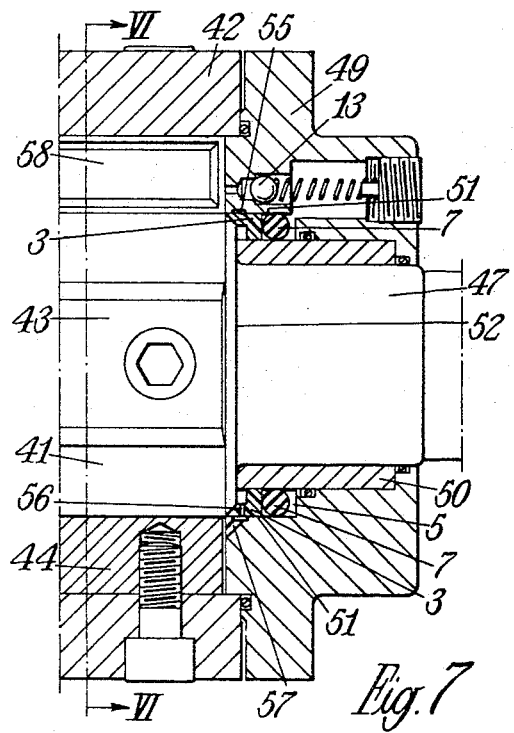
Figures 8, 9:
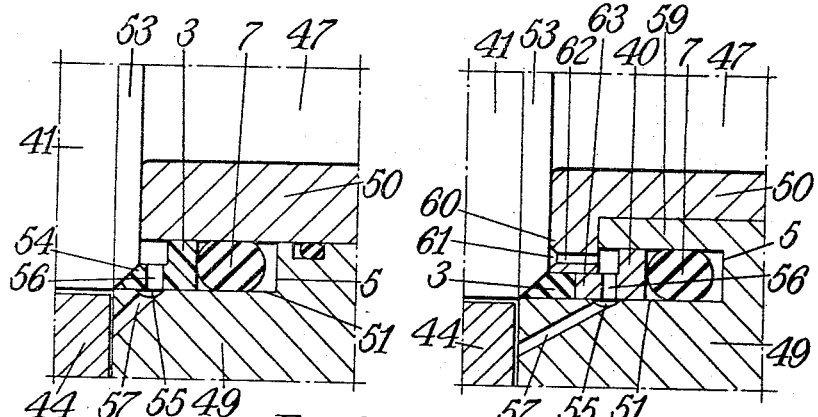
Figure 10:
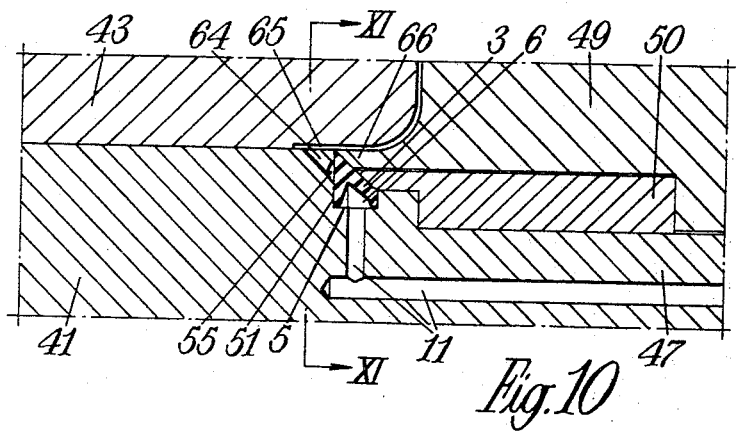
Figure 11:
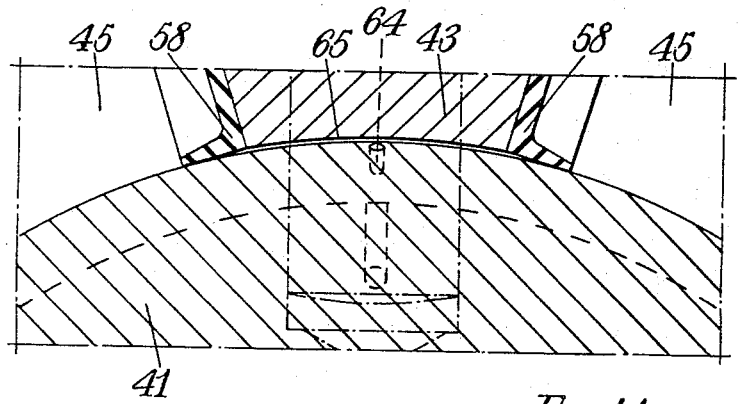

FIGURE 1 shows an hydraulic rotary vane machine with a rotating inner part and a stationary casing, provided with a form of embodiment of seals according to the invention, seen in section along the line I—I in FIGURE 2, FIGURE 2 shows the same machine seen in section along the line II—II in FIGURE 1, FIGURE 3 shows a detail of the sealing arrangement in the same machine on a larger scale, FIGURE 4 shows another form of embodiment of the sealing arrangement in the same machine, FIGURE 5 shows a detail of a form of embodiment of a seal according to the invention in an hydraulic rotary vane machine with a stationary inner part and a rotating casing, FIGURE 6 shows a cross section along the line VI—VI in FIGURE 7 of a form of embodiment of an hydraulic journal, provided with the seal according to the invention, FIGURE 7 shows a section along the line VII—VII in FIGURE 6, FIGURE 8 shows on a larger scale a form of embodiment of the seal shown in FIGURE 7, FIGURE 9 shows another form of embodiment of this seal, FIGURE 10 shows a third form of embodiment of this seal, FIGURE 11 shows a section along the line XI—XI in FIGURE 10, and FIGURE 12 shows a fourth form of embodiment of the seal shown in FIGURE 7.

*Form of embodiment I (FIGURES 1, 2 and 3)*

A rotary vane machine is provided with a vaned rotor 1 which is rotatably mounted in a casing 2 and provided with flanged end pieces 9 whose radially outer limiting surfaces 10 are mounted substantially at 45° to the radial plane and face the equidistant surfaces in the casing 2, which thus form an angle of 135° with the said radial plane. The inclined faces located on the casing 2 are provided with axially aligned annular recesses 5 in which sealing rings 3 are mounted. The innermost ends of the recesses 5 communicate by passages 11 with a duct 12, which if the motor is to be reversible communicates through non-return valves 13 with pressure-fluid ducts 14 that conduct the pressure fluid to and from the working chamber of the rotary motor.

It may be possible to connect the passages 11 direct to a pressure duct before the valve (not shown) which determines the sense of rotation.

In this form of embodiment the sealing rings 3 are made of rubber-elastic material. Behind the rings 3 are mounted pressure mediating rings 40 of rigid material and behind the rings 40 O-rings 7 of rubber-elastic material which sealingly bear against the two sides of the recess.

Since the fluid pressure acts on the rear side of the O-ring (washer) 7, this is pressed against the rigid ring 40, which in turn presses upon the rubber-elastic ring 3, whose edge 4 of the wedge-shaped cross section is adapted to fit into the V-shaped groove, formed between the side of the recess 5 facing away from the inclined surface 10 of the rotor 1 and the said inclined face 10 of the rotor, so that this edge 4 seals the break at the bottom of the V-shaped groove.

This form of embodiment is particularly suitable for machinery which runs comparatively slowly where one can be certain that the surface of the rubber-elastic ring 3 bearing against the flanged end 9 of the rotor cannot become dried-up and is thus shielded against over heating, destructive to the material.

*Form of embodiment II (FIGURES 1, 2 and 4)*

This form of embodiment, which is suitable for comparatively fast-running rotary vane machinery of the kind specified in conection with the form of embodiment I, differs from that form of embodiment in that the annular recess 5 is wider in its iner part wherein is mounted a ring 8 of rubber-elastic material which on its side facing the bottom of the recess 5 is provided with a V-shaped groove 6, whose sides form lips that are sealingly applied by hydraulic pressure to the sides of the recess 5 and at their end facing towards the narrower opening of the recess 5 are considerably thinner than at their rear part, the V-shaped groove 6 being so formed that when the limbs bounding the groove 6 are pressed together the rear part of the ring 8 becomes equally thin as its front part, so that the ring 8 can be introduced through the narrower aperture of the recess. The ring 8 is adapted to bear with its peak against another sealing ring 3 which is mounted in the narrower part of the recess 5 and whose outer end is of wedge-shaped cross section and is adapted to fit into the V-shaped groove formed between the inclined face 10 of the rotor and the side of the recess 5 that faces away from this inclined rotor face 10. The last-named ring 3 is made of bearing metal or other comparatively hard material with a low friction coefficient.

*Form of embodiment III (FIGURE 5)*

FIGURE 5 shows a form of embodiment of a seal according to the invention mounted in a rotary vane motor having a rotating vane-carrying casing and a stationary inner part 1 and a preferably low speed of rotation.

The inner part 1 is provided with a circular groove 17 constituting the working chamber of the motor (machine), the vanes 18 bearing against its base and sides in a sealingly sliding relationship. The groove 17 may preferably be provided at two diametrically opposite points with shoulders (not shown) against which the cylindrical side surface of the casing bears with play and which occupy arcs at least equal to the arcuate spacing of two adjacent vanes 18 in the casing. The inner part 1 at the points closest to the groove 17 is provided with bounding surfaces 19 converging away from the groove 17 and merging at a certain distance from the groove 17 into the cylindrical side surfaces 20, which are outwardly bounded by flat flanged ends 21 from which project central axle journals 22.

The rotating casing is provided with a cylindrical central portion (not shown) which is equally wide as the groove 17 and provided with, for instance, radial slots (not shown) in which wings (vanes) 18 are slidably and sealingly mounted and adapted to bear sealingly against the groove 17 and its shoulders (not shown).

The aforesaid central portion is provided with flanged end pieces 23 which in the vicinity of the central portion extend up to the edges 17 of the groove and lie flush with the sides of the groove 17. The side surfaces of the flanged end pieces 23 which face towards the inner portion 1 consist close to the groove 17 of parts 23 that diverge outwards at about 30° and at a certain distance from the groove 17 merge with the parts 25 that diverge at about 45° and somewhat further out pass over into cylindrical parts 26.

On the outer cylindrical side surfaces 20 of the inner portion are mounted cylindrical rings 27 which at their ends direct axially outwards are provided with plane flanges 28 which bear against the plane flanged ends 21 of the inner portion 1. Near the flanges 28 these rings 27 are provided with inward annular channels 29 for a washer (O-ring) 30 and within this channel 29 with another annular channel 31 which communicates with a source of pressure fluid (not shown) by means of passages 11 arranged in the inner portion 1 and its journal or journals 22. The channel 31 communicates with a cylindrical recess 5, provided within it in the ring 27 and extending up to the inner end of the ring 27.

The ring 27 has an outside diameter which is somewhat less than the inside diameter of the cylindrical portion 26 of the flanged end 23 of the casing, so that a cylindrical annular space 33 is obtained between these members. It is bounded at its inner end by a surface 34, which is spaced from the surface 25 and equidistant from it, passing over at its inner boundary into a surface which is parallel to and in contact with the surface 24 of the flanged end 23 of the casing.

At least one draining channel 35 is formed in the ring 27 between the surface 32 defining the radially outward boundary of the recess 5 and the surface 34.

The flanged ends 23 of the casing are provided on their plane outsides with flanges 36 which are mounted by means of roller bearings 37 on the journals 22 and are held spaced from the flanges 28 and the flanged ends 21 by pieces of bearing metal 38 laid into the flanged ends 21 of the inner portion 1. The pieces 38, if formed as full rings, are provided with at least one draining channel 39, so as to obtain a coherent draining channel from the recess 5 to the roller bearing 37.

A sealing ring 3 of rubber-elastic material is adapted to fit with a blade-like lip 4 into and bear against the V-shaped groove formed between the surfaces 19 and 24. Behind the ring 3 are mounted ring segments 40 of rigid material, which may advantageously be somewhat narrower than the width of the channel 5 located between the surfaces 20 and 32. Behind the ring segments 40 is mounted a washer (O-ring) 7 which bears sealingly against the surfaces 20 and 32. The channel 5 communicates through its rear part located behind the washer 7 with the channels 11, so that the back side of the washer 7 is acted upon by the pressure fluid operating the machine in such a way that it presses the lip 4 against the gap between the surfaces 19 and 24.

*Example of embodiment IV (FIGURES 6, 7 and 8)*

FIGURES 6, 7 and 8 show a form of embodiment of a seal according to the invention mounted in an hydraulic pivot (shaft), consisting of a cylindrical inner member 41 and a cylindrical casing 42, the inner member 41 being provided with vanes (wings) 43 which are disposed diametrically opposite one another in slidingly sealing contact with the casing 42, and the casing 42 is provided with diametrically opposed strips 44, sealingly sliding over the inner member 41, so that the casing 42 and the inner member 41, rotatably mounted therein, are restrictedly rotatable relatively to each other.

In this way the machine is given four variable-volume working chambers 45, whereof those lying diametrically opposite each other are adapted to co-act and cause the casing 42 and the inner member 41 to turn relatively to each other, as pressure fluid is supplied to the one pair of working chambers and the pressure fluid contained in the other pair of working chambers can escape unhindered.

The pressure fluid may be introduced and withdrawn either through ports (now shown) arranged on both sides of at least one of the strips 44 in the casing 42, or through central passages 46 in the two journals 47 upon which the casing 42 is mounted. The inner member 41 may advantageously be provided with at least two diametrical passages 48 which open out on both sides of the vanes 43 and, if the pressure fluid is supplied and withdrawn through the shaft (journal) passages 46, communicate each with its associated passage 46.

The casing 42, at least at its one end is provided with a detachably secured flanged end 49, which is provided with a sleeve 50 of bearing metal, fixed therein, in which is mounted the journal 47 of the inner member 41. On the inside the flanged end 49 is equipped with an annular recess 5 of rectangular cross section, whose radially outward boundary surface 51 is flush with the cylindrical side surface of the inner member 41, and which radially inwards is bounded by the bearing sleeve 50.

The flanged end 52 of the inner member 41 facing the flanged end 49 of the casing is provided on its periphery with a circular chamfer of preferably 45°.

Mounted in the recess 5 is a sealing ring 3 of anti-friction material, which may be divided into segments, and behind this ring 3 a washer 7 of rubber-elastic material, adapted to be sealingly applied to the inner and outer surfaces of the recess 5.

The rear end of the recess 5 communicates through two non-return valves 13, arranged in the flanged end 49 of the casing on both sides and within one of the strips 44, with the working chamber 45 lying nearest to the said strip 44, these non-return valves 13 being adapted to admit pressure fluid into the recess 5 from the working chamber, which in this case is under pressure.

In the part closest to the chamfer 53 the sealing rings 3 is provided with a thinner portion whose outer end is chamfered at not more than the same angle as the chamfer 53. The thinner portion 54 is equipped with at least one and preferably a plurality of radial draining through-passages 56 in front of a circular groove 55 formed in the outer radial boundary surface 51 of the recess 5. A draining passage 57 extending from the groove 55 is arranged to open out into the inner side of the flanged end 49 of the casing facing towards one of the strips 44, a break being provided between the strip 44 and the flanged end 49 of the casing, whilst the strips 44 (also vanes 43) are provided on their both sides with sealing sleeves (cuffs) 58, adapted sealingly to bear against the boundary surfaces of the working chambers 45 in such a way as to prevent pressure fluid leaving the working chambers 45, but allow the pressure fluid leaking in between the sleeves to escape to that working chamber 45 which is momentarily not under pressure.

Example of embodiment V (FIGURE 9)

This form of embodiment, which is preferably envisaged for sealing rings of rubber-elastic material, differs from the form of embodiment IV in that the flanged end 49 of the casing is provided with a groove-like recess 5 of rectangular cross section which runs round it and opens out towards its inside, and whose radially outer boundary surface 51 lies flush with the side surface of the inner member 41, and which is bounded radially inwards by an annular projection 59 made in one piece with the flanged end 49 of the casing. The bearing sleeve 50 is equipped at its axially inner end with a flange 60 extending radially outwards and adapted to bear against the axially inner end of the annular projection 59 and the flanged end of the inner member 41 and to penetrate inside the annular projection 59, but to end up in line with the radially inner edge of the chamfer 53, so that an annular space of the same radial width as the chamfer 53 is obtained between the flange 60 and the boundary surface 51. The surface of the flange 60 which faces the flat flanged end of the inner member 41 is provided with a circular groove 61 that communicates with the recess 5 by at least one axially aligned draining through-passage 62 in the flange 60.

In the annular space between the flange 60 and the limiting surface 51 is mounted a sealing ring 3 of rubber-elastic material whose axially inner end is chamfered at the same angle as the chamfer 53 and whose axially outer plane boundary face is located somewhere between the two sides of the flange 60. In the recess 5 is arranged a ring 40, which may be divided into segments, and whose axially inner part slidingly fits into the annular space between the flange 60 and the boundary surface 51, and which is provided in its axially inner thinner portion 63 outside the flange 60 with at least one, and preferably with several, radial draining through-passages 56 which open out into an annular groove 55 formed in the boundary surface 51.

Since the sealing ring 3 is completely enclosed in metal, its rubber-elastic material cannot escape at any point.

Form of embodiment VI (FIGURES 10 and 11)

In this form of embodiment the inner member 41 is provided with a surrounding recess 5 having sides disposed in parallel radial planes. The axially inner limiting surface 51 of the recess 5 is located axially within the axially outer end of the vanes 43 and provided with a surrounding groove 55. A draining passage 64 extending from this groove 55 is adapted to open out into a break 65 arranged at the end of the vane 43 between the vane 43 and the inner member 41 between the sealing sleeves 58 of the vanes 43.

The flanged end 49 of the casing is arranged to extend with a rim 66 up to the boundary surface 51, the rims 66 inner end being bevelled, preferably at 45°, so that the rim 66 ends up with its blade-like edge, located within the working chamber 45, at the boundary surface 51. A bearing sleeve mounted upon the journal 47 is provided at its axially inner end with a chamfered terminal surface, which lies flush with the chamfered terminal surface of the rim 66.

A sealing ring 3 of rubber-elastic material is mounted in the recess 5. Its radially inward terminal surface is chamfered, so that it bears against the chamfered terminal surfaces of the rim 66 and of the bearing sleeve 50. The radially outer side of the ring 3 is equipped with a surrounding, substantially V-shaped groove 6, so that the ring 3 is given on its outside two surrounding lips, adapted to be urged into contact with the sides of the recess 5 by the pressure fluid reaching the recess 5 through passages 11, formed in the journal 47.

Form of embodiment VII (FIGURE 12)

In this form of embodiment the flanged end 49 of the casing for an hydraulic shaft is mounted upon the journal 47 of the inner member 41 by means of a roller bearing 67, which is sealed on the outside by a conventional sealing ring 68. Axially within the bearing 67 a ring 69 is threaded upon the journal 47 and its axially inner side is provided with a turned recess whose limiting surface is bevelled at its radially outer side surface 71 of the ring 69, to pass over radially further in into a portion chamfered at about 45°.

Axially within the ring 69 there is mounted upon the journal 47 another ring 70, whose axially outer end runs out into a blade-like edge, which extends inside the working chamber 45 up to the flanged end 49 of the casing. The axially outer boundary surface of the ring 70 is chamfered at the meeting with the flanged end 49 of the casing at about 60° towards the side surface 71 of the ring 69, to merge radially further in with a portion chamfered at about 45°.

A sealing ring 3 of a wedge-shaped cross section is lodged in an annular channel 5 formed between the rings 69 and 70. Behind this ring 3 is mounted a washer (O-ring), adapted to seal against the walls, chamfered at 45°, of the channel 5. Pressure fluid is supplied to the radially inner part of the channel 5 through passages 11 formed in the journal 47.

Although only a few forms of embodiment have been described and illustrated above, further forms may fall within the scope of the invention.

I claim:

1. Arrangement for sealing a pressure-loaded gap between two surfaces facing each other on two machine elements rotatable relatively to each other, preferably in hydraulic machinery, characterized in that it comprises an annular recess whose two sides are equidistant in the inner portion of the recess but towards the mouth of the recess pass over into portions converging towards the said mouth, so that these convergent portions form a groove of V-shaped cross section which opens out into the said gap, and a sealing ring which is lodged in the said recess and provided with a lip fitting into the V-shaped groove and adapted to be brought to bear against the pressure-loaded gap at the bottom of the V-shaped groove with its blade-like edge by a liquid pressure acting on the side of the ring, rear opposite the lip, the pressure acting upon the back side of the sealing ring being at least equally high per unit area as the pressure acting per unit area of its lip.

2. Arrangement as claimed in claim 1, characterized in that the base of the recess is connected to a duct which supplies pressure fluid to the machine.

3. Arrangement as claimed in claim 1, characterized in that sealing members adapted to apply sealingly to the equidistant side portions of the recess are mounted on the rear of the ring.

4. Arrangement as claimed in claim 3, characterized in that the said sealing members are formed as lips of rubber-elastic material projecting from the rear of the ring which are separate from the groove of V-shaped cross section.

5. Arrangement as claimed in claim 3, characterized in that the said sealing members are formed as a washer (O-ring) bearing against the rear of the ring.

6. Arrangement as claimed in claim 5, characterized in that a pressure mediating ring of rigid material is provided between the ring and the washer.

7. Arrangement as claimed in claim 6, characterized in that the pressure mediating ring is divided into segments.

8. Arrangement as claimed in claim 1, in which said machine elements are provided with working chambers, the rear end of the recess communicating with the working chambers by means of two non-return valves, provided on the two sides of and within at least one of the strips (battens) which are fixed in the casing and separate working chambers of the shaft (pivot) from each other.

9. Arrangement as claimed in claim 1, characterized in that a passage for the withdrawal of leaking pressure fluid from the recess is provided between the edge of the sealing ring and the sealing members.

10. Arrangement as claimed in claim 9 in connection with hydraulic pivots, characterized in that the passage extends from a circular groove formed in one side of the recess.

11. Arrangement as claimed in claim 10, characterized in that the passage opens out into the interior of the casing's flanged end between sleeves which are arranged on the two sides of a strip (batten) fixed in the casing or of a vane fixed to the inner member and which are adapted to seal off pressure directed at the strip or vane, so that any pressure fluid that has leaked out can escape through one of the sleeves to that working chamber which is not under pressure at the time.

References Cited

UNITED STATES PATENTS

| | | | |
|---|---|---|---|
| 723,656 | 3/1903 | Dunn | 123—8 |
| 1,944,875 | 1/1934 | Bullington | 123—8 |
| 1,967,703 | 7/1934 | Bullington | 123—8 |
| 2,790,520 | 4/1957 | Kuhn | 123—8 |
| 3,134,600 | 5/1964 | Fisch | 123—8 |
| 3,139,233 | 6/1964 | Simonsen | 123—8 |
| 3,171,590 | 3/1965 | Bentele et al. | 230—145 |
| 3,195,421 | 7/1965 | Rumsey et al. | 123—8 |

FOREIGN PATENTS

| | | |
|---|---|---|
| 1,000,030 | 1/1957 | Germany. |
| 181,592 | 11/1962 | Sweden. |

DONLEY J. STOKING, *Primary Examiner.*

W. J. GOODLIN, *Assistant Examiner.*